Nov. 16, 1948. A. BETZ 2,453,964
COUPLING FOR SHAFTS
Filed Dec. 1, 1943 2 Sheets-Sheet 2

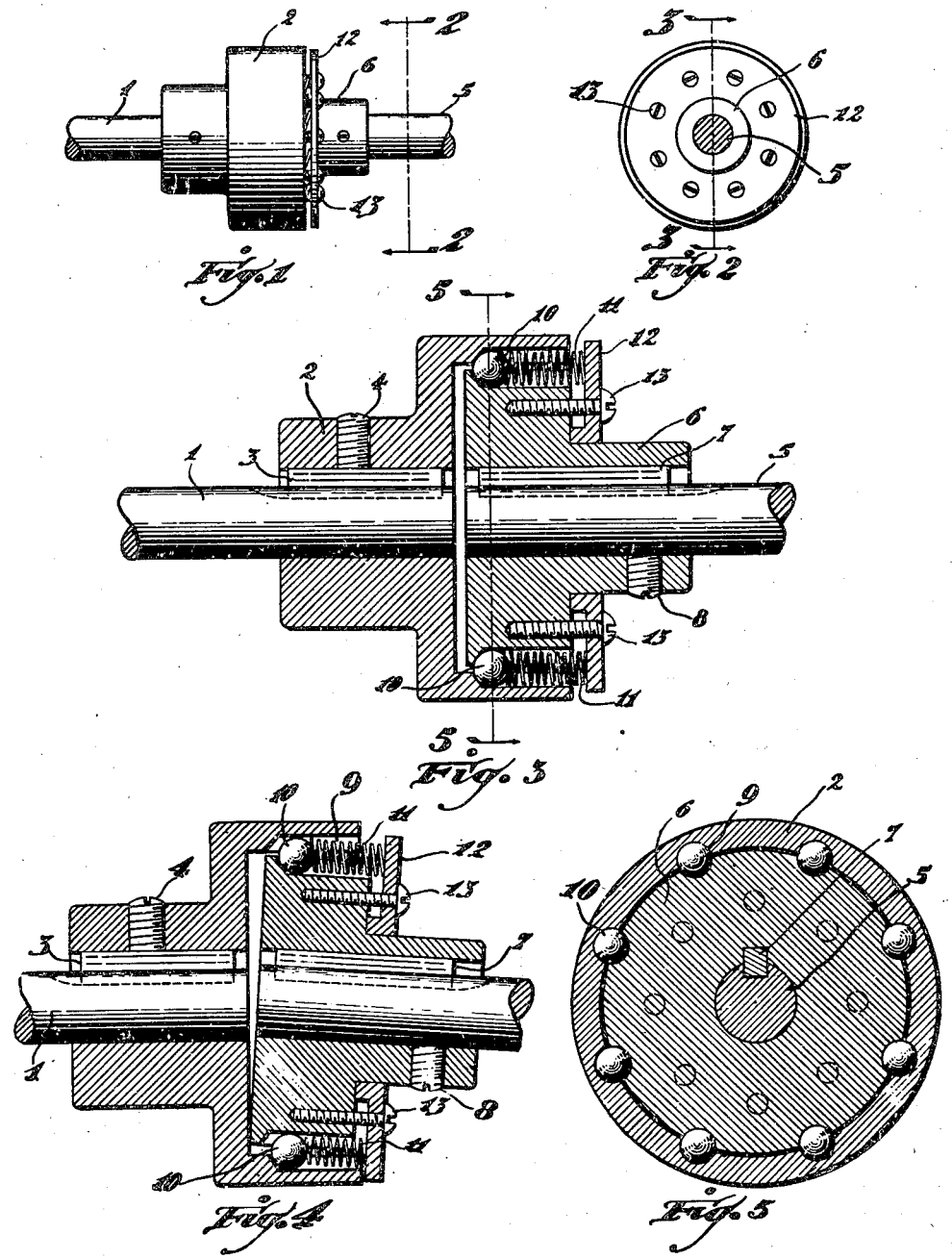

INVENTOR.
Albert Betz
BY
Wood, Arey, Herron & Evans
Attorneys.

Patented Nov. 16, 1948

2,453,964

UNITED STATES PATENT OFFICE 2,453,964

COUPLING FOR SHAFTS

Albert Betz, Hamilton, Ohio

Application December 1, 1943, Serial No. 512,451

2 Claims. (Cl. 64—9)

This invention relates to flexible couplers for shafts, and particularly to an improved coupler characterized by the fact that it permits the coupled shafts to tilt angularly in respect to each other and to move longitudinally with respect to one another.

The object of the present invention is to produce a flexible coupler of the character described which is durable and more easily fabricated than those of this general type which have been available in the past.

Other objects and further advantages of the present invention will be more fully apparent from the detailed description of the drawings, in which:

Figure 1 is a side elevational view of a preferred form of flexible coupler of the present invention shown in coupled position on the ends of two shafts.

Figure 2 is a cross sectional view taken along the line 2—2 of Figure 1.

Figure 3 is a longitudinal sectional view taken along the line 3—3 of Figure 2.

Figure 4 is a longitudinal sectional view similar to Figure 3 but showing the shafts disposed angularly with respect to each other.

Figure 5 is a cross sectional view taken along the line 5—5 of Figure 3.

Figure 6:
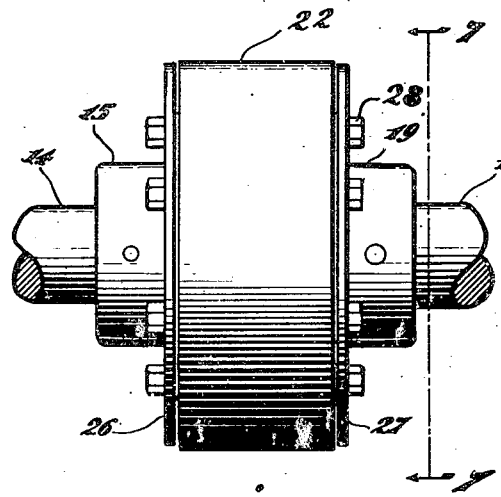
Figure 6 is a side elevational view of a modified form of flexible coupler.

Referring to the drawings, and particularly to Figures 1 to 5, a shaft 1 has secured to its end a cup-shaped female member 2. The attachment of the member to the shaft is effected by means of a key 3 and a set screw 4. The other shaft 5 which is to be coupled to the shaft 1 has at its end a male member 6 held by means of a key 7 and a set screw 8. The outside of the male member 6 is slightly smaller than the inner circumference of the female member 2 in order to permit the shafts to tilt in respect to each other.

The inner surface of the female member 2 and the outer surface of the male member 6 are both cylindrical and circular holes 9 are disposed circumferentially about the coupler, each hole being partly in each member. This is readily accomplished by making the two members to fit snugly, then drilling the holes, then turning the inner or outer member to provide the desired clearance. This is shown best in Figure 5.

In each hole is a ball 10 backed up by a spring 11. These springs are held in place by means of a collar 12 secured to the inner member by means of screws 13. The collar is so constructed that the portion holding the springs in position is spaced from the inner member so that the shafts may tilt without the collar abutting the female member 2, as shown in Figures 3 and 4. In this construction, the balls constitute the means for interconnecting the male and female members, without preventing longitudinal movements or angulation of the shafts.

Figure 7:
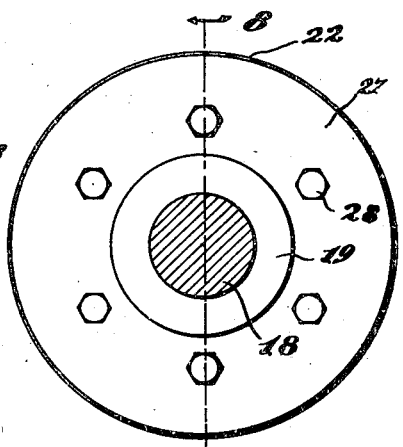
Figure 7 is a cross sectional view taken along the line 7—7 of Figure 6.
Figure 8:
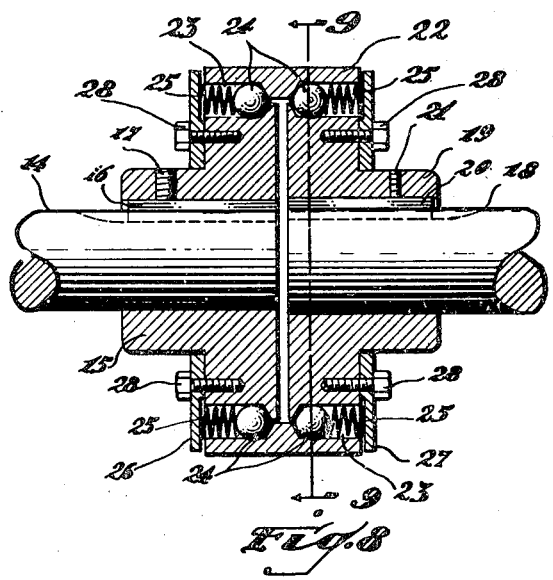
Figure 8 is a longitudinal sectional view taken along the line 8—8 of Figure 7.
Figure 9:
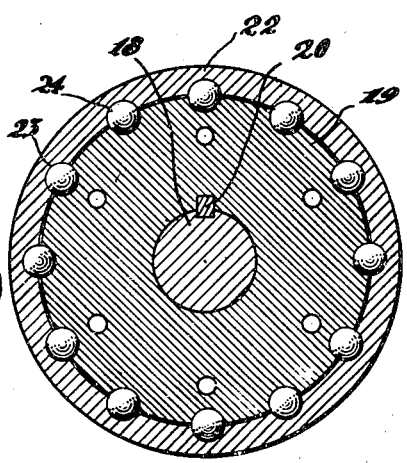
Figure 9 is a cross sectional view taken along the line 9—9 of Figure 8.

Figures 6 to 9 inclusive disclose a double coupler which, for some purposes, is superior to the coupler shown in Figures 1 to 5. In this coupler a shaft 14 has an inner member 15 attached to it by means of a key 16 and set screw 17. A shaft 18 also has an inner member 19 attached to it by means of a key 20 and set screw 21. An annular outer member 22 surrounds the inner members 15 and 19. Circular holes 23 are disposed each partially in this outer collar and each partially in one of the inner members. The structure may be fabricated by the application of the same principle as that used in the manufacture of the coupler disclosed in Figures 1 to 5. In each hole is disposed a ball 24 backed up by a spring 25. These springs are held in place by means of collars 26 and 27, each held to the outer face of each inner member by means of screws 28, as previously described. As in the other form, the portions of the collars holding the springs are spaced from the respective outer members in order to permit the shafts to tilt.

By assembling the coupling parts, then drilling the ways in which the balls reside, alignment between the two sections delineating each hole is insured and there is no necessity for maintaining very accurate circumferential spacing of the holes. The load upon the balls is thereby equalized and each carries its full portion of the load. The springs press the balls toward the bottoms of the holes, but, under pressure, they may move outwardly to accommodate a misalignment or angulation between the shafts. Thus, when the shafts are angulated, the diameter of the ball holes, in a direction circumferentially of the coupling, does not vary, but the diameter in a direction radially of the coupling varies and the balls urged by spring pressure adjust themselves to a position between the inner and outer members to accommodate this variation. The coupling, therefore, is rugged, simple and durable and may be fabricated readily without the use of precise machinery.

Having described my invention, I claim:

1. A flexible coupler for shafts comprising an inner member, an outer member, one rigidly secured to one shaft, the other rigidly secured to the other shaft, holes parallel to the shafts when aligned, said holes disposed partly in the inner member and partly in the outer member inclined surfaces at the bottoms of the holes, balls fitting the holes disposed in the holes, springs disposed in each hole pressing the balls inwardly against said inclined surfaces, a detachable ring and means for securing said ring to the coupler adjacent the open ends of said holes, said ring providing a seat for the ends of said springs.

2. A flexible coupler for shafts comprising inner members rigidly secured on the adjacent ends of both shafts, an annular outer member surrounding said inner members, holes parallel to the shafts when aligned, each hole disposed partly in one of the inner members and partly in the outer member inclined surfaces at the bottoms of said holes, balls disposed in said holes, springs pressing said balls inwardly against said inclined surfaces, a detachable ring and means for securing said ring to the coupler in spaced relation therewith adjacent the open ends of said holes, said ring providing a seat for the ends of said springs.

ALBERT BETZ.

REFERENCES CITED

The following references are of record in the file of this patent:

UNITED STATES PATENTS

| Number | Name | Date |
|---|---|---|
| 1,208,252 | Westinghouse | Dec. 12, 1916 |
| 1,675,065 | Thomas | June 26, 1928 |
| 1,763,332 | Sykes | June 10, 1930 |
| 1,861,364 | Schreck | May 31, 1932 |

FOREIGN PATENTS

| Number | Country | Date |
|---|---|---|
| 172,944 | Germany | July 11, 1906 |
| 704,381 | France | Feb. 23, 1931 |